United States Patent [19]

Rye et al.

[11] Patent Number: 5,062,462

[45] Date of Patent: Nov. 5, 1991

[54] PNEUMATIC TIRE MADE BY BUTT-SPLICING STRUCTURAL MEMBERS AND A METHOD THEREFOR

[75] Inventors: Grover W. Rye, Cuyahoga Falls; David A. Kindry, Clinton; Carolyn T. Weber, Mogadore, all of Ohio

[73] Assignee: The Goodyear Tire & Rubber Company, Akron, Ohio

[21] Appl. No.: 467,715

[22] Filed: Jan. 19, 1990

[51] Int. Cl.$^5$ .......................... B60C 9/02; B29D 30/06
[52] U.S. Cl. ................................. 152/548; 156/134; 156/304.3
[58] Field of Search ............... 156/304.1, 304.3, 304.4, 156/157, 133, 134, 122, 123, 130, 130.7, 137; 152/548; 474/253, 255, 257; 51/399; 428/57-59, 61

[56] References Cited

U.S. PATENT DOCUMENTS

| 298,095 | 5/1884 | Kleinert . |
| 1,350,995 | 8/1920 | Grabau . |
| 2,391,731 | 12/1945 | Miller et al. . |
| 2,524,456 | 10/1950 | Masland . |
| 2,975,095 | 3/1961 | Bletso . |
| 3,154,897 | 11/1964 | Howard ................................. 51/399 |
| 3,615,994 | 10/1971 | Maclaine et al. ..................... 156/159 |
| 3,690,363 | 9/1972 | Guyot . |
| 4,215,516 | 8/1980 | Huschle . |
| 4,466,473 | 8/1984 | Matyja . |
| 4,733,709 | 3/1988 | Lambillotte . |
| 4,768,575 | 9/1988 | Bruner . |
| 4,810,317 | 3/1989 | Lane . |

FOREIGN PATENT DOCUMENTS

G8813969.7 11/1988 Fed. Rep. of Germany .

OTHER PUBLICATIONS

James River Corp (Nonwoven Division) Product Description "Cerex®", 3/88.
Product Guide, Goodyear Chemicals, "Pliocord Vinyl Pyridine Latex" (1973 and 1985).
"Standard Test Methods for Breaking Load and Elongation of Textile Fabrics", An American National Standard (1986).

Primary Examiner—Geoffrey L. Knable
Attorney, Agent, or Firm—David E. Wheeler

[57] ABSTRACT

The invention relates to a butt splicing technique for use in manufacturing reinforced elastomeric articles, in particular pneumatic tires. In the method, after a butt splice is made, a spun-bonded material is applied to the splice area as a splicing strip. The spun-bonded material has stress/strain/expansion characteristics that closely resemble such properties in an elastomeric component of the article which is spliced so that the splicing strip does not unduly distort the reinforcing structure of the component, while preventing opening of the splice during construction. Articles made using the method are also provided.

14 Claims, 4 Drawing Sheets

PNEUMATIC TIRE MADE BY BUTT-SPLICING STRUCTURAL MEMBERS AND A METHOD THEREFOR

BACKGROUND OF THE INVENTION

This invention relates to pneumatic tires wherein the structural members are held together in the building of the tire by a new butt-splicing technique, and a method of using such a technique in the building of a tire.

In the building of pneumatic tires, the structural elements, such as the carcass plies, are laid down in one or more sections on a tire building drum Since it is important that the ends of these structural elements are strongly connected to one another, so that the ends of the plies will not separate in the expansion step in the building of a tire, it is common in the prior art to lay down the plies in an overlapping configuration known in the art as an overlapping splice. The overlapping splice holds the ends of the plies together in the tire building process The use of the overlapping splice, especially in the carcass plies, has the disadvantage, however, that in the regions where the plies overlap, there is an uneven expansion of the ply in the expansion step because of the large number of reinforcing members in the overlap area, as compared with the number of reinforcing members in the rest of the tire construction Accordingly, the splicing, although necessary in the building of the tire, causes the tire to have a certain amount of nonuniformity which may cause sidewall undulations (bulges and valleys) in the tire. Such nonuniformity has a tendency to cause a vibration and noise when the tire is running.

In an attempt to eliminate overlapping splices in a tire, the prior art has attempted to build tires using butt splices wherein the ends of the carcass and belt plies of the tire are laid down abutting one another, rather than overlapping. In the prior art butt splices, the ends of the plies where they abut are held together during the building of the tire by an overlapping section of adhesively coated fabric. Although an improvement over the overlap splice, the fabric used in the butt splice still adds substantially to the mass of the tire in the splice area, and may cause restriction of the expansion of the carcass ply and does not totally eliminate distortion in the splice area.

It is the purpose of the present invention to provide a tire using a butt splice whereby the splicing material is of minimum gauge and produces minimum distortion in the splice area and which substantially and economically improves tire uniformity and substantially eliminates sidewall undulations and gaps.

Also, a method is provided to produce a butt splice which will not open during tire shaping and produces minimum distortion in the splice area, while not adding appreciably to the gauge and mass nor detracting from the durability of the tire.

THE PRIOR ART

Kleinert, in U.S. Pat. No. 298,095, issued May 6, 1884 teaches a method of joining two pieces of rubber comprising applying a preparation of rubber to the edges to be joined, and then bringing the edges in contact without overlapping them, to allow the rubber to cohere.

Grabau, in U.S. Pat. No. 1,350,995 issued Aug. 24, 1920 teaches a vehicle tire including a strip of belt fabric extending circumferentially, and means for connecting the ends of the belt strip including a tongue on one end overlapped on the other end Also, a cover strip is used to connect the ends of the joint.

Miller et al., in U.S. Pat. No. 2,391,731 issued Dec. 25, 1945 teach the joining of two portions of sheet material, especially abrasive sheet material, using an adhesive material 14 and splicing material 15 to splice two abutting pieces of material.

Masland, in U.S. Pat. No. 2,524,456, issued Oct. 3, 1950 teaches a method of joining pieces of carpet which includes the use of a backstrip 25 which lies against the backs of the carpet pieces and is secured thereto in any suitable manner, as for example by stitches 26 (FIG. 3), cement 27 (FIG. 4), or stitches in cement (FIG. 5).

Huschle et al., in U.S. Pat. No. 4,215,516, issued Aug. 5, 1980 teach a splicing system for the butt splicing of endless flexible abrasive belts which employs an adhesive having a multiplicity of unidirectionally oriented reinforcing fibers spanning the butt joint to form a durable long lasting splice. Fibers, which are embedded in a cohesive member form a reinforcement strip which is bonded to the adhesive belt surface. The fibers are high modulus organic fibers, preferably having a tensile modulus in excess of about $15 \times 10^6$ psi and a tensile strength in excess of 200,000 psi.

Matyja et al., in U.S. Pat. No. 4,466,473, issued Aug. 21, 1984 teach a method of making radial pneumatic tires which was intended to substantially reduce or eliminate sidewall indentations in the inflated tire. The method comprised making a plurality of cuts in one end of each layer of ply fabric where the end of the ply fabric overlaps the other end to form a splice which results in the generally annular shape of the ply layer The cuts were intended to prevent overtensioning of the ply cords, which is one of the causes of sidewalls indentations.

Lambillotte et al. in U.S. Pat. No. 4,733,709 issued Mar. 29, 1988 teaches a radial tire with a reinforced butt spliced carcass ply wherein two sets of polymeric cords or strands, which are in a crosshatched relation, are used to cross adjacent reinforcement cords of the carcass ply at opposite angles of 45°.

Bruner, et al. in U.S. Pat. No. 4,768,575, issued Sept. 6, 1988 teach a pneumatic tubeless tire wherein the free ends of the carcass fabric are butted together around the body, to provide a butt seam. The free ends of the fabric are held together in substantial butting position by placing an open mesh or knit splicer fabric in place using adhesive or the like, optionally applying rubber tack over the splicer fabric. The open mesh fabric appears to have no machine direction or cross-machine direction yarns, but only carcass yarns. It typically comprises a two-bar partially threaded warped-knit mesh fabric whereby the threading is one in, one out, on both the back guide bar and the front guide bar.

Lang, in U.S. Pat. No. 4,810,317 issued Mar. 7, 1989 teaches a method for prevention of wall-indentations in a splice region of a tire carcass by joining two cut edges of the tire carcass and applying to the splice region a splice tape which overlaps the cut edges of the carcass. The splice tape comprises cord fabric, knitted fabric, pleated fabric, or a flat fabric in which the warped threads have a higher rigidity than the weft threads (Column 2, lines 36–40).

German Utility Patent G 8 813 969.7 teaches a vehicle tire with reinforcing insert of cord fabric which uses inserts of fabric segments (A) and (B) which may abut one another and may be held in place by an overlay fabric (C) strip.

SUMMARY OF THE INVENTION

In its preferred embodiment, the present invention relates to a pneumatic tire comprising at least one carcass ply having longitudinal reinforcing members therein disposed over an inner liner, said at least one carcass ply having edges wrapped around tire beads and two free ends. The free ends of the carcass plies of the tire abut one another such that side by side longitudinal reinforcing members embedded in the carcass plies are substantially parallel to the free ends of the ply, and a cord next to a free end is next to a cord in an abutting free end of the ply. A splicing strip comprising spun bonded filaments of synthetic material bridges the abutting free ends of the carcass ply.

Also provided are methods by which the tire of the invention can be made, comprising disposing carcass plies on a tire building drum whereby free ends of each said carcass ply are butt spliced, and applying a spun bonded synthetic material bridging the abutting ends of the carcass plies. Belt plies may be added which can optionally be applied using the same butt splicing technique. After applying sidewall and tread rubber, the completed tire structure is vulcanized.

Also provided is a method of making a splice in an elastomeric article comprising the steps of abutting the ends of elastomeric components, and bridging the abutting ends of the elastomeric components with a spun bonded splicing strip, having the following characteristics, as measured in a direction perpendicular to the splice on which it is used:

(a) an average breaking load of 1 to 4 lbs as measured by ASTM No. D-1682-64 07.01;

(b) an average of 40 to 70% elongation at break as measured by ASTM No. D-1682-64 07.01: and (c) an elongation of 26% when subjected to an average load in the range of 1 to 3 lbs. as measured by ASTM No. D-1682-64 07.01: said averages being determined by a minimum of five measurements on said splicing strip material when the spun-bonded material has been coated with a resorcinol-formaldehyde-latex adhesive and an elastomeric material.

In the specific embodiment described herein, the structural member may be either a carcass ply or a belt ply.

Also provided is a method of splicing reinforced elastomeric components which are subject to expansion in the building of an article comprising the steps of abutting free ends of the non-cured components prior to expansion and bridging the abutted ends of the elastomeric components with a splicing strip chosen to have expansion characteristics similar to the expansion characteristics of the elastomeric components and permit substantially even distribution of reinforcing elements in an expanded component.

In the building of tires, using the splicing method and the splicing material described herein, it has been found that the overall uniformity of a tire has been improved since a butt splice has been provided which will not open during tire shaping while producing minimum distortion in the splice area. Also, using the method and splicing material of the invention in the carcass plies has substantially reduced or eliminated sidewall undulations and gaps.

DEFINITIONS

As used herein, the following terms have the following meanings;

"longitudinal reinforcing members" refers to cords, i.e. plied yarns, "cable", i.e. two or more plied yarns twisted together, steel or metal wires, monofilaments or filaments, and other reinforcing members used for the same purpose.

"machine direction" refers to the direction a fabric (in the present application, a spun bonded synthetic material) is extruded or removed from the machine, usually its direction of greatest strength "equatorial plane" refers to the plane perpendicular to the tire's axis of rotation and passing through the center of its tread carcass ply "end" refers to the end cut parallel to the longitudinal reinforcing member to give the required circumferential dimension (length) required for use in a tire construction carcass ply "edge" refers to the end cut from calendered stock fabric (across the reinforcing members) to provide the required width dimension of the carcass ply in the tire construction

DETAILED DESCRIPTION OF THE PREFERRED EMBODIMENTS

Figure 1:
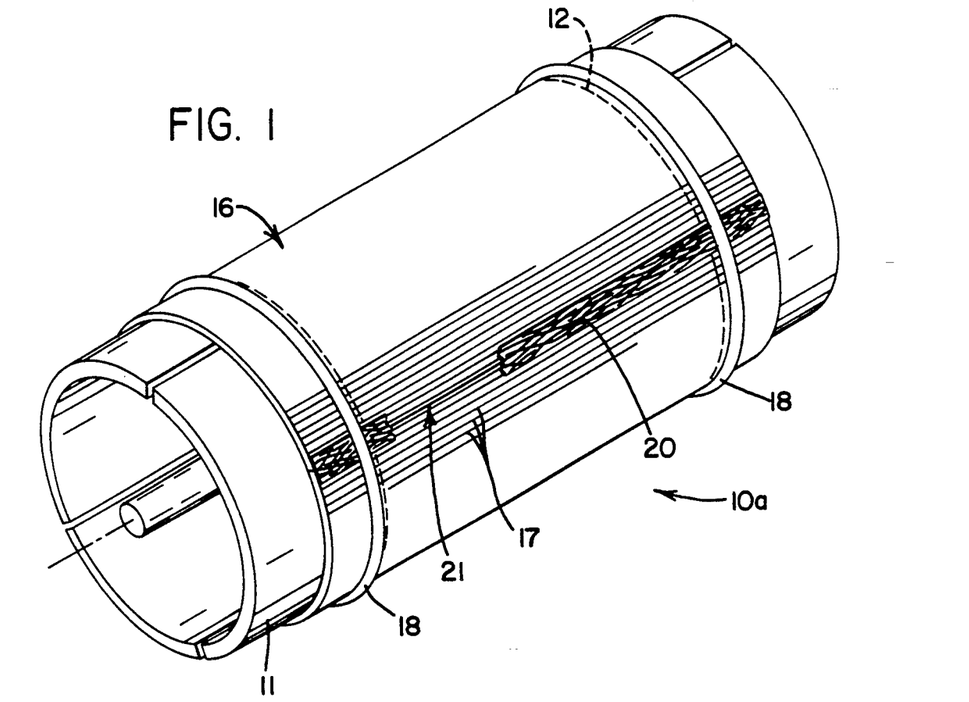
FIG. 1 illustrates a tire drum and on which carcass plies have been applied and butt spliced, and tire beads have been placed over the carcass plies

With reference to FIG. 1, the initial construction 10a of a pneumatic tire on a collapsible tire drum 11 is illustrated. In FIG. 1, an optional inner liner 12 is illustrated as applied to tire drum 11, and one or more structural members, such as carcass ply layers 16 are applied thereto. The carcass ply 16 comprises longitudinal reinforcing members 17 which, in the illustrated embodiment of a radial tire, are substantially parallel to the central axis of the tire building drum 11.

Carcass plies are generally defined in terms of the orientation of their parallel longitudinal reinforcing members (cables, cords, monofilaments, etc). In the illustrated embodiment the carcass plies are radial plies. Those skilled in the art will recognize that tires can be made using the materials and methods of the invention using bias plies, wherein the parallel longitudinal reinforcing members are at an angle of 20° to 40° (green) with respect to the longitudinal axis of the tire building drum.

Generally, carcass plies are cut having a width and length suitable for the particular tire being built The ends of the carcass plies are cut parallel to the reinforcing members therein. The carcass ply is laid down on the tire building drum having its width dimension longitudinally disposed on the drum, and its length dimension being disposed on the circumference of the drum. In the illustrated embodiment wherein the carcass ply is butt spliced, the length of the carcass ply is equal to the circumference of the tire construction at the point in the construction where it is applied, and the longitudinal free ends of the carcass ply are abutted against one another on the tire building drum wherein the longitudinal reinforcing member in one free end of the carcass ply is next to a longitudinal reinforcing member in the other free end of the carcass ply. The width ends (edges) of the carcass ply, as is normal in the tire building art, are wrapped around the tire beads at a later point in the tire construction as described below. The point where the two free ends of the carcass ply abut is known as the splice area.

After the ends of the carcass ply are abutted, spun-bonded synthetic material 20 is rolled onto splice area 21. Other means of applying the splicing strip will be recognized by those skill in the art.

Figure 5:
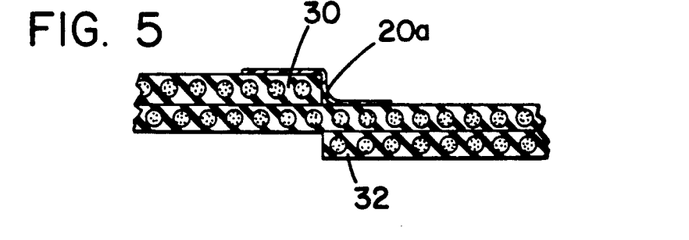
FIG. 5 illustrates a top splice.

In the case where a two-ply carcass is used, the carcass structure may be wrapped around the tire construction twice, whereby the second end of the carcass circumvents the tire and ends substantially at the point where the first end of the carcass ply was laid down on the tire construction. In such an arrangement, as illustrated in FIG. 5, the splice is called a top-splice.

Those skilled in the art will recognize splices are used to prepare carcass plies for their use in a tire construction. As is conventional in the art, the reinforcing cords used in carcass plies are calendered in long rolls having a width of, for example, about 60 inches. To prepare a radial carcass ply, the roll of 60 inch material is cut into lengths having the width (for example 18 inches) required for a carcass ply, and the 60 inch sections are pre-spliced end to end to provide a roll of carcass ply material having the desired width. The roll of carcass ply material is then cut in lengths (for example 40 inches) necessary for their use in a tire. Accordingly, it will be apparent to those skilled in the art that tires can be made having both preparation and builder's splices. The butt splicing technique described herein and the desirable properties obtained applies to preparation splices as well as builder's splices.

It is desirable that the spun bonded synthetic material be very thin with a minimum density to allow carcass rubber penetration through the voids of the fabric and to add as little as possible to the mass and gauge of the tire construction. The material is selected having strength sufficient to prevent splice opening, and to provide elongation necessary in the 60% to 100% expansion of the tire in the building process. Also, it is desirable that the stress/strain properties of the splicing material match (within 30 to 100%) the strain properties of the carcass ply which are observed during shaping (expansion) of the tire carcass, to allow the ply under the splicing strip to elongate in order to minimize end count distortion.

In the illustrated embodiment, the splice fabric used in the butt splicing of the carcass plies (and the belt plies as described below) is a spun-bonded nylon (a nonwoven synthetic material) which is sold under the name of Cerex ® by the James River Corporation. The spun-bonded fabric comprises a 100% nylon 6,6 which is made directly from molten polymer as continuous filaments that are self-bonded at each crossover point during its extrusion. For its use in the tire of the present invention and the production method by which the tire is made, it is desirable that the spun-bonded material be further treated by dipping the material into a resorcinol-formaldehyde-latex (RFL) adhesive of the type generally used in the tire industry, and then into a solvated elastomer solution.

With reference to the particular materials being bonded in a specific application of the invention, any adhesive known to those skilled in the art for bonding a synthetic material to rubber may be used to coat the spun bonded fabric prior to its placement in an elastomeric article. Examples of such adhesives are disclosed in U.S. Pat. Nos. 2,902,398; 2,929,737; 2,844,181; 2,917,422; and 2,959,821. In the illustrated embodiment, an RFL adhesive of the type disclosed in U.S. Pat. No. 2,975,095 at col. 1, lines 35 to 42 or sold under the name Pliocord LVP-4668B by The Goodyear Tire & Rubber Company, Akron, Ohio was used.

In the illustrated embodiment, as is conventional in the art, the solvated elastomer comprises natural rubber, carbon black, sulfur, and rubber initiators and accelerators dissolved in a suitable solvent (rubber cement). The solvent used may comprise toluene, xylene, or other suitable hydrocarbon, a mixture thereof, or other suitable solvent wherein the rubber is solvated to have a viscosity of between 6,000 to 20,000 cps, preferably between 10,000 and 14,000 cps.

An exemplary rubber cement which is especially useful with carcass plies comprises 100 parts natural rubber, 2–8 phr resin type oil, 2–10 phr tackifying resin, 40–55 phr N-347 carbon black, about 3 phr sulfur, about 1 phr disulfide (e.g MBTS), about 0.75 phr accelerator (e.g. DPG), about 1 phr Stearic acid, and about 3 phr ZnO in 100% naptha. The composition typically comprises 5–20% solids.

The spun-bonded materials may be coated with adhesive by hand (for example by spraying or dipping), but in a manufacturing process, it is desirable that a mechanized process, similar to the dipping processes described in U.S. Pat. Nos. 2,859,133; 3,019,016; 3,156,581 or 3,231,415 be used.

The RFL or other adhesive assures chemical bonding between the synthetic material and rubber since the RFL adhesive bonds to both the synthetic material and to rubber. The dipping process provides a substantially uniform, tacky material (solvated elastomers provide the tack) which adheres readily to the green rubber used in the manufacture of the tire. In the illustrated embodiment, the spun-bonded material used in the invention has a density of 0.2 to 0.8 ounce per square yard of material. Generally it has been found that material having a density of 0.3–0.4 ounce per square yard is suitable for use in passenger tires; that somewhat denser materials, having a density of about 0.5 ounce per square yard is suitable for use in truck tires; and that 0.6 to 0.8 ounce fabric may be used for larger tires such as off-the-road tires.

Those skilled in the art will recognize that the main purpose of the RFL and solvated elastomer are to provide bonding between rubber and the synthetic fabric, and to provide sufficient tack for the splicing strip to adhere to green rubber while the tire is being constructed, and that other suitable adhesive systems may be devised for this purpose. For example an polyisocyanate/rubber cement may be coated on the synthetic fabric for this purpose. Also, a greige synthetic fabric may be applied to the splice area of a tire, and a cement may be applied to the greige synthetic fabric in place in the tire construction. Other suitable adhesives and methods of application will be apparent to those skilled in the art.

It has been found that Cerex ® has the desired stress/strain/expansion properties in the direction perpendicular to its machine direction, and accordingly, after the spun-bonded material has been dipped as described above, it is cut into strips having a width, in the illustrated embodiment, of about one-half inch in its direction perpendicular to its machine direction. The length of the splicing strip is determined by, and is equal to the length of the splice area of the ply.

After dipping, the finished weight of the synthetic fiber was tested in the range of 0.60-0.92 ounce per square yard, and preferably in its use in passenger tires has a density of about 0.62 ounce per square yard. The gauge of the dipped fabric for use in passenger tires is about 0.0025 to 0.005 inch. Those skilled in the art will recognize that for truck tires higher gauges, for example 0.0025 to 0.010 inch may be used.

Spun-bonded spliced fabric 20 may be from one-quarter inch to one-inch wide depending on the specific application or specific kind of tire which is being constructed. In a passenger tire, it is generally preferred that the splicing strip be about 0.5 inch wide. If the splicing strip is too narrow, the splice may not be strong enough to prevent opening of the splice during the expansion of the tire in the building process, and if the splicing strip is too wide, the splicing strip may restrict the expansion of the ply cords in the splice area during the expansion step, and thereby cause distortion in the tire.

Even though use of the splicing strip of the invention is an improvement over the prior art, the splicing strip still may restrict the cords. Accordingly, it is desirable to keep the splicing strip as narrow as possible to minimize any possible cord deformation.

It is important that the splicing strip provide sufficient strength to keep the splice from opening in the building of the tire, yet have sufficient expansion characteristics to permit a relatively uniform distribution of reinforcing members in the splice area.

After the carcass plies have been spliced, tire beads 18 are added to the tire construction.

Figure 2:
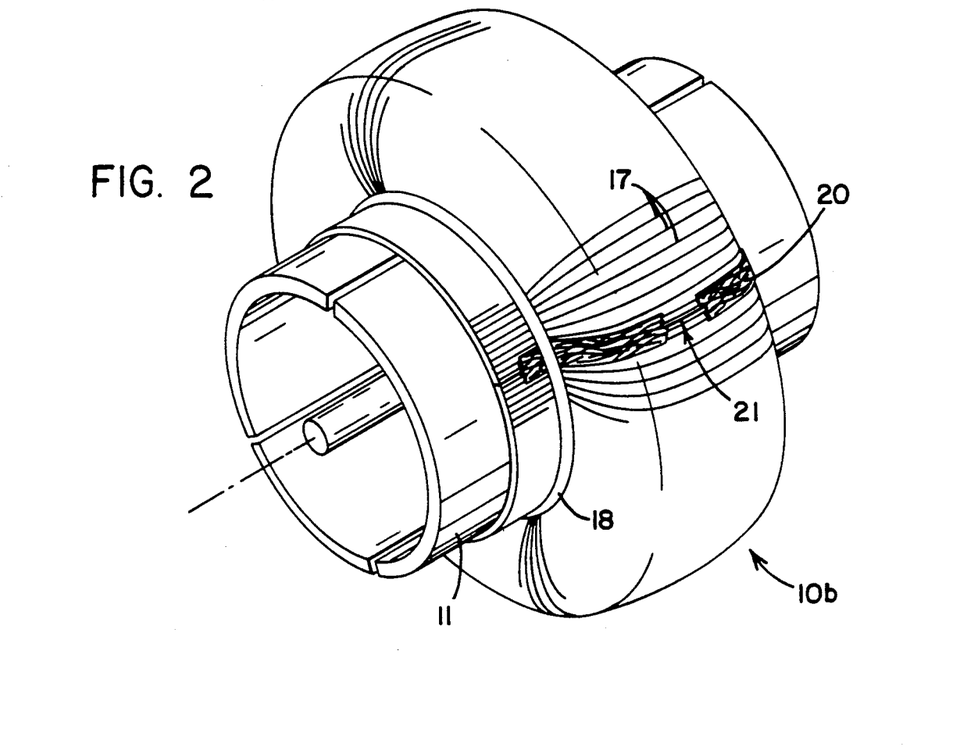
FIG. 2 illustrates the expansion step in the tire building process.
Figure 3:
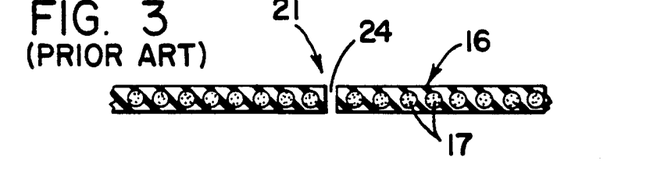
FIG. 3 illustrates an open splice.

With reference now to FIG. 2, as is conventional in the tire building art, the tire building drum is activated to simultaneously move the tire beads 18 toward one another and to blow air under tire construction 10b to cause expansion of the inner liner and the carcass ply. Because, in its preferred embodiment, longitudinal reinforcing members 17 are substantially inextensible, it is the rubber of the inner liner and the carcass ply that expands, and longitudinal reinforcing members 17 "spread out" in the expanded carcass ply. For example, if longitudinal reinforcing members 17 are present in the carcass ply at a density of 28 ends per inch (EPI) in the unexpanded carcass ply, they may be present in the circumference of the tire after expansion at a density of about 16-20 EPI. It is important for the integrity of the tire that the longitudinal reinforcing members 17 be substantially uniformly distributed in the tire, and if splice area 20 opens during the expansion step (as illustrated in FIG. 3) open area 24 (a wide space without longitudinal reinforcing members) would represent a weak spot in the tire which would be susceptible to blow-out, and the tire would have to be scrapped.

Figure 4:
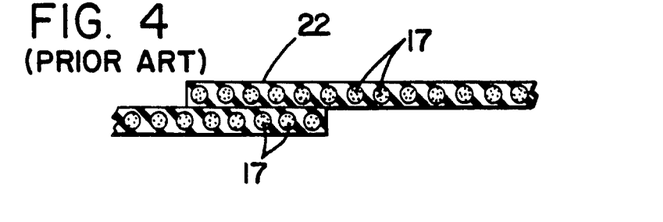
FIG. 4 illustrates the cord concentration caused by an overlapping splice.

With reference to FIG. 4, in order to illustrate the result obtained using the prior art overlap splicing technique, it should be noted that in the area of an overlap splice 22 there are substantially 56 EPI of reinforcing members 17 (28 EPI in each end of the carcass ply). This relative proportion of reinforcing members remains after expansion of the carcass ply. Nonuniformity in the distribution of the reinforcing members restricts the dynamic action of the tire, and may cause rough riding or handling characteristics as well as unsightly sidewall undulations (valleys and bulges) because the stress per cord is altered in the area of the carcass where there is a high EPI count.

With reference now to FIG. 5, in an embodiment where a two ply carcass is used, a carcass ply, having a length equal to twice the circumference of the tire construction at the point where it applied in the tire, is wrapped around the tire construction twice, whereby the second end 30 stops substantially at the point where first end 32 was first laid down in the construction. Splicing strip 20a is then laid down covering second end 30 and a portion 34 of the carcass ply which overlaps first end 32. Such an arrangement is called a top splice. After expansion, the longitudinal reinforcing members are substantially evenly distributed.

Figure 6:
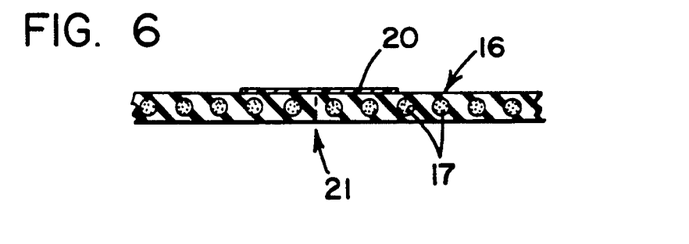
FIG. 6 illustrates the desired configuration of butt splices after expansion.

FIG. 6 is representative of the desired distribution of the longitudinal reinforcing members in a butt spliced carcass ply when made according to the present invention. Similar distribution, although doubled in density, is obtained using a top splice.

Figure 7:
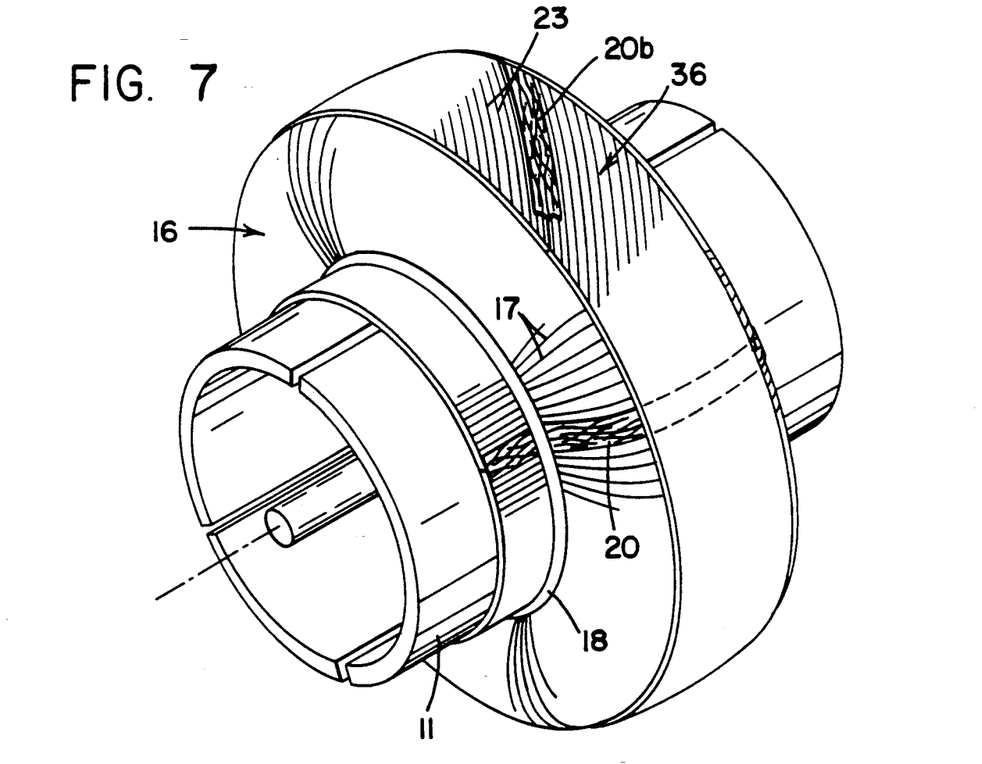
FIG. 7 illustrates the tire construction with the addition of belt plies.

With reference now to FIG. 7, after the expansion of the carcass plies, belt plies 36 are then added to the belt construction. Belt ply 36, is laid down circumferentially on top of the carcass plies in the crown area of the tire construction. The longitudinal reinforcing members 23 of belt ply 36 run at an angle of (+) plus or (−) minus 17° to 28° with respect to the equatorial plane of the tire. Although no unusual stresses are encountered by the belt plies in the construction of a tire, because of the low gauge of the spun bonded synthetic material, the belt may be applied to the tire construction using a butt-splicing technique, wherein the ends of the belt are abutted against one another on the tire construction and a spun-bonded splicing strip 20b, as described above, is placed over the two free ends of the belt.

Figure 7A:
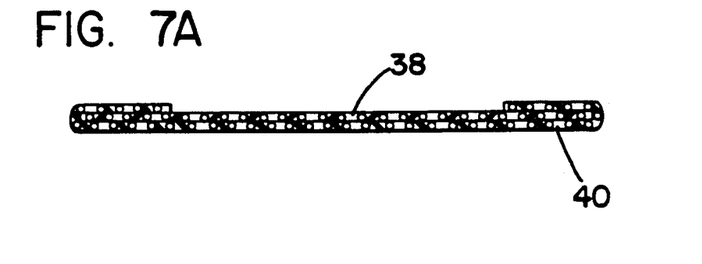
FIG. 7a illustrates a folded belt construction.

In certain tire constructions it has been found to be desirable to provide a folded belt structure as illustrated in FIG. 7a. In such a folded belt structure a first, relatively wide belt ply 40 is first laid down in the tire construction and a second narrower belt ply 38 is placed thereover. The edges of belt ply 40 are then folded over the edges of belt ply 38. In such an arrangement, the folding of belt ply 40 causes stresses (expansion) on the butt splice of belt ply 40 similar to those seen in the expansion of the carcass ply in the expansion step in the building of a tire. Accordingly, the use of spun bonded synthetic material in the butt splicing of belt plies, especially folded belt plies, is intended to be embraced by the present method, and the tires produced thereby.

Figure 8:
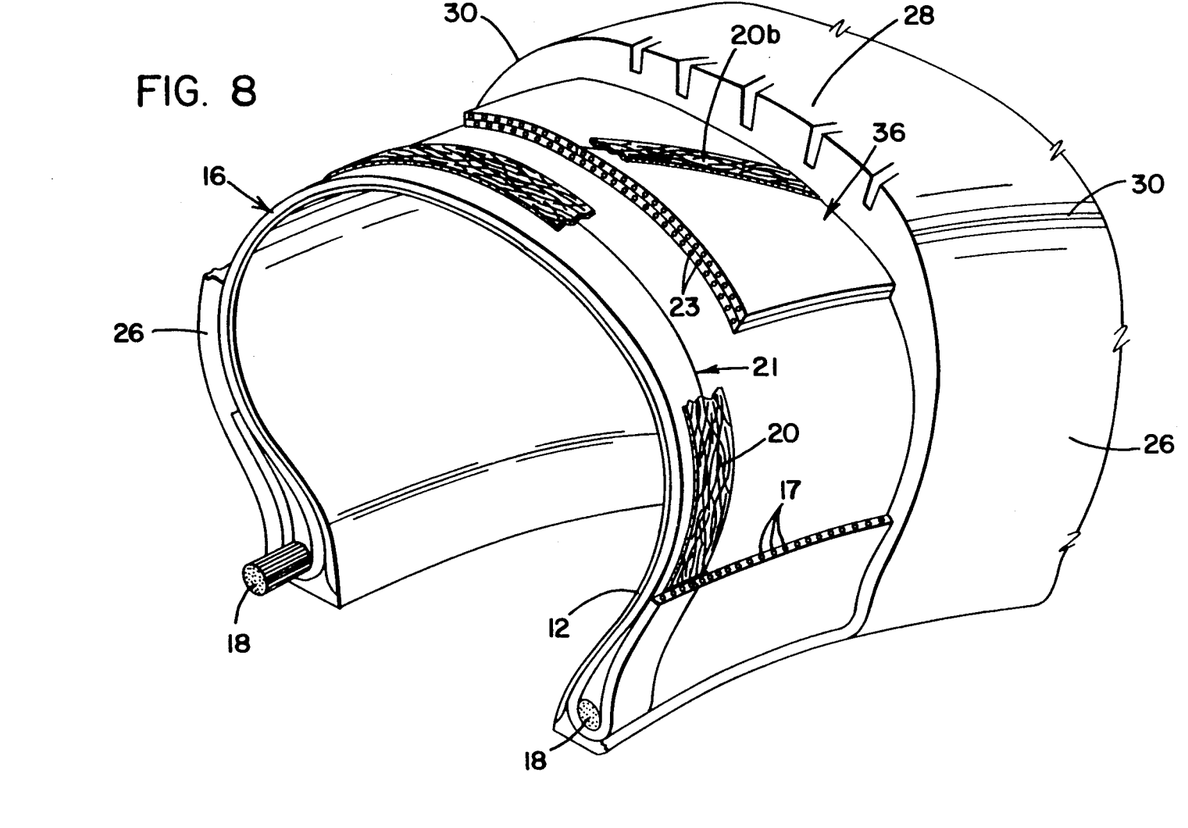
FIG. 8 illustrates a cutaway view of a completed tire construction.

Subsequent to the addition of the belt 36, the sidewalls 26, shoulder 30, and tread 38, as illustrated in FIG. 8, are added to the tire construction as is conventional in the art, and the entire construction is then vulcanized.

As illustrated in the following examples, the tires made according to the present inventions have good uniformity and the method substantially reduces or eliminates sidewall undulations and gaps. Accordingly, the tires made according to the present invention demonstrate low amplitude vibration when subjected to standard tests.

The tires and methods of invention are further illustrated with reference to the following examples.

EXAMPLE 1

A P195/75R14 monoply passenger tire and a two ply 205/75R14 passenger tire were made using a butt splice held in the construction by a spun-bonded nylon fabric (Cerex ®) and compared with similar production tires made using a conventional overlap splice.

The tires were made in the conventional manner except for the butt splicing of the carcass plies. A ½ inch wide strip of 0.3 oz. Cerex ® was coated with undertread cement (a rubber to rubber adhesive) by hand and applied across the splice and stitched with a roller to provide intimate contact and adhesion. The tire construction was completed in a conventional manner.

The following TIRE EVALUATIONS table compares the properties of the experimental tires with similar production tires (control).

In the table RFV represents the radial force variation, R1H represents the first harmonic of the radial force variation, LFV represents the lateral force variation, L1H represents the first harmonic of the lateral force variation, and RRO represents radial run-out. The force variations were measured in pounds.

The data in the table indicates superior properties in the butt spliced tire with reference to the radial force variations and sidewall undulations (SW). SW was measured in inches.

All data is reported with reference to the control. That is, each value obtained is divided by the value obtained for the control to provide a ratio. Accordingly, the control is reported as having a value of 1.

The lower numbers for radial force variation for the Cerex ® spliced tires indicate an improved circumferential uniformity.

| TIRE EVALUATIONS | | | | | | |
|---|---|---|---|---|---|---|
| Passenger | RFV | R1H | LFV | L1H | RRO | SW UNDULATIONS |
| P195/75R14 (Mono) (Limited Tires) | | | | | | |
| Control (1) | 1 | 1 | 1 | 1 | | .030/.040 |
| Cerex ® Ply Splice | .52 | .23 | 1.83 | 1.96 | | .001/.004 |
| 205/75R14 (2 Ply) | | | | | | |
| Control | 1 | 1 | 1 | | 1 | |
| Cerex ® | .81 | .74 | 1.04 | | .75 | |

Greige spun-bonded fabric of the kind (Cerex ®) used in this example was measured to have the following properties.

| | Greige 0.3–0.4 oz. Cerex ® |
|---|---|
| Griege wt (Oz/yd²) | 0.22–0.49 |
| Gauge (inch) | 0.014–0.0039 |
| GRAB (4" × 8") (Machine Direction) | |
| Break Load (lbs) | 2.6–20.1 |
| % Elong. @ Brk (Cross Direction) | 23–58 |
| Brk Load (lbs) | 1.6–10.6 |
| % Elong @ Brk | 17–81 |
| 1" Strip (Machine Direction) | |
| Brk Load (lbs) | 1–7.9 |
| % Elong. @ Break (Cross Direction) | 16–52 |
| Brk Load (lbs) | 0–3.4 |

| | |
|---|---|
| *-continued* | |
| % Elong @ Break | 4–57 |

| | Average Tear Strength (lbs) | | Mullen Burst |
|---|---|---|---|
| Cerex | Machine Dir. | Cross Dir. | (PSI) |
| 0.3 | 3.5 | 2.4 | 18 |
| 0.4 | 4.3 | 3.0 | 22 |

EXAMPLE 2

This example illustrates material specifications for the spun-bonded fabric used as a splicing material in the present invention. The physical properties described were obtained after sequentially dipping the spun-bonded material in an RFL adhesive of the type described in U.S. Pat. No. 2,975,095 and solvated natural rubber having a viscosity of about 12,000 cps. The data was obtained using standard tests under ASTM No. D-1682-64 07.01.

| MATERIAL SPECIFICATIONS | | |
|---|---|---|
| | | Preferred |
| Greige Weight (Oz./yd²) = | 0.25–0.45 | (0.3; 0.4) |
| Treated Weight (Oz./yd²) = (RFL & Rubber Cement Dips) | 0.62–1.0 | (0.7–0.85) |
| Gauge (Inch) = | 0.0020–0.005 | |
| Adhesion (lbs/in.) = | 20 (minimum) | |
| Tack (gm/in) = | 100 (minimum) (400 max if rolled onto itself) | |

| | GRAB (4" × 8" sample) | | |
|---|---|---|---|
| | Break Load (lbs) | % Elong at Break | LASE @ 26% |
| Machine Direction (n = 5) | 10–32 | 20–50 | 7–20 AIM |
| Cross Direction (n = 5) | 5–13 | 38–65 | 2–10 |
| | 1" STRIP (1" × 8" sample) | | |
| Machine (n = 5) | 4–8 | 30–40 | 4–7 |
| Cross (n = 5) | 1.3–3.0 | 45–65 | 1–2 |

EXAMPLE 3

Examples 3–6 compare the properties of production monoply tires sold under the tradename TIEMPO (control) with tires designated as CBS made using the butt splicing technique of the invention. The CBS tires were made with spun-bonded synthetic material which was dipped in RFL adhesive and solvented elastomer (cement) as described in Example 2.

Since a high amplitude for the radial and lateral force variations is an indication of low uniformity in a tire, the FORCE RESULTS table illustrates that the CBS tires demonstrated improved uniformity in the dynamic tests. The data is reported as described in Example 1.

| | FORCE RESULTS | | | |
|---|---|---|---|---|
| Type/No. Tires | RFV AVG/SD | R1H AVG/SD | LFV AVG/SD | L1H |
| Control | 1 | 1 | 1 | 1 |
| 50 | 3.7 | 4.0 | 3.3 | — |
| CBS | 0.885 | 0.648 | 0.915 | 0.698 |
| 24 | 3.7 | 3.6 | 2.9 | — |

EXAMPLE 4

Similarly, measurements of the bulges and valleys in tires described in Example 3 illustrate improved uniformity for the CBS tires. T/Bulge represents the bulge measured at the top of the tire and B/bulge represents the bulge measured at the bottom of the tire. T/valley and B/valley are similarly defined with respect to the valleys measured.

| Type/No. Tires | T/BULGE AVG/SD | T/VALLEY AVG/SD | B/BULGE AVG/SD | B/VALLEY AVG/SD |
|---|---|---|---|---|
| Control | 1 | 1 | 1 | 1 |
| 50 | 2.0 | 2.3 | 1.5 | 1.9 |
| CBS | 0.786 | 0.908 | 0.783 | 0.919 |
| 24 | 2.0 | 1.2 | 1.4 | 0.6 |

EXAMPLE 5

BALANCE RESULTS

This example illustrates the results of dynamic balancing tests made on the constructed tire samples. S. Bal indicates static balance, Uf represents a force component of static balance, D. Bal indicates dynamic balance, and Um represents a moment component of the dynamic balance.

The S. Bal. numbers are given in ounces and represent the weight needed to bring the tire into bubble balance. The dynamic balance is determined while the tire is spinning and is also given in ounces. Uf is given in inch-ounces and takes into consideration the distance from the center of the wheel that a weight is placed. Um is given in inches squared-ounces and is representative of the moment of the corrected weight in a spinning tire.

Again, the results of the balancing tests demonstrate improved properties for the CBS tires as compared to the control tires.

| Type/No. Tires | S. Bal AVG/SD | Uf AVG/SD | D. BAL AVG/SD | Um AVG/SD |
|---|---|---|---|---|
| Control | 0.928 | 6.958 | 1.117 | 28.275 |
| 25 | 0.605 | 4.535 | 0.556 | 14.069 |
| CBS (Cement -RFL) | 0.650 | 4.873 | 0.860 | 21.780 |
| 24 | 0.389 | 2.917 | 0.393 | 9.936 |

EXAMPLE 6

A statistical test method which isolates specific components of a tire was used to measure specifically the effect of the carcass splice on the uniformity of a tire. This example illustrates that butt splicing provides a lower contribution to the various measured force variations than does the overlap splice. The data is provided in terms of a ratio as described in Example 1.

| Type | EFFECT OF A CARCASS SPLICE ON FORCE VARIATIONS | | | |
|---|---|---|---|---|
| | RFV-1 | RFV-2 | LFV-1 | LFv-2 |
| Control | 1 | 1 | 1 | 1 |
| CBS (Cement-RFL) | 0.76 | 0.77 | 0.87 | 0.70 |

The following tables provide additional data relating to similar trials made on several kinds of tires which are manufactured at different production facilities.

The data in Table I illustrates a Goodyear production tire sold under the tradename INVICTA as a control tire. The CBS tire is identical to the production tire except for the use of the Cerex ® butt splice in place of the overlap splice. The data is presented as a ratio with reference to the control tire. Accordingly, the control tire has a value of 1 for all parameters.

TABLE I

| | COMPARATIVE DATA RELATING TO A 2 PLY CARCASS TIRE (INVICTA) | | | | | |
|---|---|---|---|---|---|---|
| | RF | 1H | LF | BULGE | VALLEY | # TIRES |
| CONTROL | 1 | 1 | 1 | 1 | 1 | 55 |
| CBS | 0.836 | 0.883 | 0.797 | 0.652 | 0.804 | 30 |

While specific embodiments of the invention have been illustrated and described, it will be recognized that the invention variously modified may be practiced without departing from the spirit and scope of the invention. The invention is limited only by the following claims.

We claim:

1. In a pneumatic tire comprising at least one carcass ply having longitudinal reinforcing members therein disposed over an inner liner, said carcass ply being wrapped around tire beads and having two free ends, wherein
   (a) the free ends of said carcass plies abut one another such that side by side longitudinal reinforcing members embedded therein are substantially parallel to said free ends, and a longitudinal reinforcing member next to a free end is next to a longitudinal reinforcing member in an abutting free end, and a splicing strip comprising spun-bonded filaments of synthetic material bridges said free ends of said carcass plies, and
   (b) wherein said spun-bonded synthetic material has a density of between about 2.0 oz and 0.6 ox/sq yd and wherein said spun-bonded synthetic material has expansion properties similar to the expansion properties of the carcass plies during the building of the tire.

2. The pneumatic tire according to claim 1 wherein said spun-bonded filaments of synthetic material, prior to incorporation in said tire, has the following characteristics as measured in a direction perpendicular to the direction of said splice:
   (a) an average breaking load of 1.0 to 8.0 pounds as measured by ASTM No. D-1682-64 07.01;

(b) an average of 20 to 70% elongation at break as measured by ASTM No. D-1682-64 07.01; and (c) an average load in the range of 1 to 6 pounds measured at 26% elongation determined from data obtained by ASTM No. D-1682-64 07.01, said averages being determined by a minimum of five (5) measurements on said splicing strip material when said spun-bonded material has been coated with an adhesive system.

3. The pneumatic tire according to claim 1 wherein said spun-bonded filaments of synthetic following characteristics as measured in a direction perpendicular to the direction of said splice:

(a) an average breaking load of 1.0 to 4.0 pounds as measured by ASTM No. D-1682-64 07.01;

(b) an average of 40 to 70% elongation at break as measured by ASTM No. D-1682-64 07.01: and (c) an average load in the range of 1 to 3 pounds measured at 26% elongation as determined from data obtained by ASTM No. D-1682-64 07.01, said averages being determined by a minimum of five (5) measurements on said splicing strip material when said spun-bonded material has been coated with a resorcinol-formaldehyde-latex adhesive and an elastomeric material.

4. The pneumatic tire of claim 1 in which the machine direction of the spun bonded material used for splicing said carcass plies is substantially parallel to the direction of the longitudinal reinforcing members in said carcass plies.

5. The pneumatic tire of claim 1 wherein said spun-bonded synthetic material has a density of between about 0.3 oz. and 0.5 oz/sq yd.

6. The pneumatic tire of claim 1 wherein said splicing strip is about ¼ to 1 inch wide.

7. The pneumatic tire of claim 1 wherein said splicing strip is about ⅜ to ⅝ inch wide.

8. A pneumatic tire comprising a matrix of elastomeric material having a carcass ply of side-by-side longitudinal reinforcing members embedded therein, said carcass ply having a pair of free ends which abut one another such that a longitudinal reinforcing member which is next to a free end is next to a longitudinal reinforcing member which is next to said other free end, and a splicing strip bridging the free ends of said carcass ply, said splicing strip comprising spun bonded filaments of synthetic material wherein said spun-bonded synthetic material has a density of between about 0.2 oz and 0.6 oz/sq yd and having the following characteristics, prior to incorporation into said tire as measured in a direction perpendicular to the machine direction of said spun bonded material:

(a) an average breaking load of 1.0 to 4.0 pounds as measured by ASTM No. D-1682-64 07.01;

(b) an average of 40 to 70% elongation at break as measured by ASTM No. D-1682-64 07.01; and (c) an elongation of 26% when subjected to an average load in the range of 1 to 3 pounds as measured by ASTM No. D-1682-64 07.01, said averages being determined by a minimum of five (5) measurements on said splicing strip material when said spun bonded material has been coated with a resorcinol-formaldehyde-latex adhesive and an elastomeric material, said splicing strip being disposed such that the machine direction of the spun bonded material is parallel to the free ends of said carcass ply.

9. A pneumatic tire comprising a matrix of elastomeric material having a carcass ply of side-by-side longitudinal reinforcing members embedded therein, said carcass ply having a pair of free ends which abut one another such that a longitudinal reinforcing member which is next to a free end is next to a longitudinal reinforcing member which is next to said other free end, and a splicing strip disposed in juxtaposed relationship with the free ends of said carcass ply, said splicing strip comprising spun bonded filaments of a synthetic material wherein said spun-bonded synthetic material has a density of between about 0.2 oz and 0.6 oz/sq yd and having the following characteristics prior to incorporation into the tire as measured in a direction perpendicular to the machine direction of said spun bonded material:

(a) an average breaking load of 1.3 to 3.0 pounds as measured by ASTM No. D-1682-64 07.01;

(b) an average of 45 to 65% elongation at break as measured by ASTM No. D-1682-64 07.01; and (c) an elongation of 26% when subjected to an average load in the range of 1 to 2 pounds as measured by ASTM No. D-1682-64 07.0; said averages being determined by a minimum of five (5) measurements on said splicing strip material when said spun bonded material has been coated with a resorcinol-formaldehyde-latex adhesive and an elastomeric material, said splicing strip being disposed such that the machine direction of the spun bonded material is parallel to the axis of rotation of the tire.

10. A method of manufacturing a tire comprising the steps of:

(a) disposing a carcass ply on a tire building drum and butt splicing free ends of said carcass play with a splicing strip comprising spun bonded synthetic material bridging the free ends of said carcass ply, said spun bonded synthetic material having expansion properties similar to the expansion properties of the carcass ply during the building of the tire;

(b) applying tread and sidewall rubber; and (c) vulcanizing the completed structure.

11. The method of claim 10 which further comprises sequentially dipping said spun bonded synthetic material in a resorcinol-formaldehyde-latex adhesive and an elastomer solvent composition prior to its application as a butt splice material.

12. The method of claim 10 comprising the step of cutting said spun bonded material in a half inch width in the direction perpendicular to its machine direction to form said splicing strip.

13. The method of claim 10 which comprises the further step of applying an annular structural member over said carcass plies.

14. A method of manufacturing a tire comprising the steps of:

(a) wrapping a carcass ply of unvulcanized rubbery material having side-by-side longitudinal reinforcing members embedded therein around a substantially cylindrical tire building drum such that said reinforcing members are parallel to the longitudinal axis of said drum;

(b) joining free ends of the carcass play in un-lapped, abutting relation to form a butt splice between the ends; and (c) placing a splicing strip in juxtaposed relation with said butt splice, said splicing strip material comprising spun bonded filaments of a synthetic material coated with a resorcinol-formaldehyde-latex adhesive and an elastomeric material, the machine direction of the spun bonded material extending parallel to the longitudinal axis of the building drum, the splicing strip material having the following characteristics as measured in a direction perpendicular to the machine direction of said splicing strip material;
(i) an average breaking load of 1.3 to 3.0 pounds as measured by ASTM No. D-1682-64 07.01
(ii) an average of 45 to 65% elongation at break as measured by ASTM No. D-1682-64 07.01;
(iii) an elongation of 26% when subjected to an average load in the range of 1 to 2 pounds as measured by ASTM No. D-1682-64 07.01;
said average being determined by minimum of five (5) measurements on said splicing strip material.

* * * * *